US005881195A

United States Patent [19]

Walker

[11] Patent Number: 5,881,195

[45] Date of Patent: Mar. 9, 1999

[54] IMAGE GUIDE COMPRISING A PLURALITY OF GRADIENT-INDEX OPTICAL FIBERS

[75] Inventor: James K. Walker, Gainesville, Fla.

[73] Assignee: Nanoptics, Inc., Gainesville, Fla.

[21] Appl. No.: 725,780

[22] Filed: Oct. 4, 1996

Related U.S. Application Data

[63] Continuation-in-part of Ser. No. 712,919, Sep. 12, 1996, abandoned.

[51] Int. Cl.[6] .......... G02B 6/06

[52] U.S. Cl. .......... 385/116

[58] Field of Search .......... 385/115, 118, 385/147, 33

[56] References Cited

U.S. PATENT DOCUMENTS

| | | |
|---|---|---|
| 3,838,905 | 10/1974 | Irie . |
| 4,389,655 | 6/1983 | Baues . |
| 4,525,874 | 7/1985 | Baiies . |
| 5,371,826 | 12/1994 | Friedman . |

FOREIGN PATENT DOCUMENTS

| | | |
|---|---|---|
| 0265074 | 4/1988 | European Pat. Off. . |
| 0427232 | 5/1991 | European Pat. Off. . |
| 0710855 | 5/1996 | European Pat. Off. . |
| 9115793 | 10/1991 | WIPO . |

OTHER PUBLICATIONS

Greengrass, S.M. and M. Cunningham (1993) "Endoscopy" Measurement + Control 26(4): 109–114.

Tsumanuma et al. (1988) "Ultra Thin Silica Based Imagefiber For The Medical Usage" Proc. of SPIE (Jan. 13–16, 1988, Los Angeles, CA, USA), Optical Fibers in Medicine III 906:9296.

"Borescope Aids Welding in Confined Spaces" (1990)NTIS Tech Notes, Springfield, VA, US.

Emslie, Christopher (1988) "Review Polymer Optical Fibers" Journal of Materials Science 23:2281–2293.

Epstein, Max (1982) "Fiber Optics in Medicine" In: *CRC Critical Reviews in Biomedical Engineering* 7(2):79–120.

*Primary Examiner*—Akm E. Ullah

*Attorney, Agent, or Firm*—Saliwanchik, Lloyd & Saliwanchik

[57] ABSTRACT

The present invention is an image guide which has applications in such areas as endoscopy and industrial imaging. This invention utilizes gradient-index optical fiber in order to produce an image guide with improved performance characteristics. These improved performance characteristics include increased brightness, enhanced resolution, greater flexibility, and smaller diameter. The smaller diameter of the image guide permits access through smaller apertures in order to image inaccessible locations.

25 Claims, 6 Drawing Sheets

Primary coating

Image fiber { Silica cladding

Image Circle

Core

Cladding

Pixel arrangement

IMAGE GUIDE COMPRISING A PLURALITY OF GRADIENT-INDEX OPTICAL FIBERS

CROSS-REFERENCE TO A RELATED APPLICATION

This application is a continuation-in-part of co-pending application Ser. No. 08/712,919, filed Sept. 12, 1996 now abandoned.

BACKGROUND OF THE INVENTION

Image guides are bundles of optical fibers which convey optical images. Because each optical fiber of an image guide transmits only a minute discrete portion of the image, it is of course necessary for each end of the image guide to be coherently related to the other end such that the image exiting the image guide is identical to that which enters the multiplicity of fibers. Image guides are used in a variety of industrial and medical imaging scopes. For example, endoscopes utilize image guides to convey images of human and/or animal vessels and internal cavities. Additionally, image guides are also used in industrial borescopes used for many types of industrial imaging.

Image quality is critical to the performance of image guides. Specifically, resolution, brightness, and contrast sensitivity are a few important performance characteristics which affect image quality. Resolution can be expressed as the measure of the image guide's ability to separate images of two neighboring object points. Improved image resolution can be obtained by having a larger number of optical fibers, in the bundle, per unit area. The brightness of an image guide is a measure of the ratio of the amount of light exiting the output end of the image guide to the amount of light incident to the input end of the image guide. The brightness of an image guide can be improved by, for example, increasing the portion of the image guide end available for light transmission, increasing the numerical aperture (NA), and/or decreasing the transmission loss of the image guide. The contrast sensitivity is a measure of the ratio of the amount of light, comprising the image, exiting the output end of the image guide to the total amount light exiting the output end of the image guide. The light exiting the output end of the image guide, and not contributing to the image, reduces the contrast sensitivity.

Depending upon the intended use of the image guide, other characteristics such as flexibility may also be important. For example, it is often advantageous for image guides to have great flexibility to reach otherwise inaccessible locations such as coronary vessels. In other applications, such as laparoscopy, a more rigid image guide is preferred. The subject invention concerns, in one aspect, improved image guides which result in endoscopes and borescopes with highly advantageous characteristics.

One specific embodiment of the subject invention is the use of improved image guides in angioscopes. Angioscopy is a specific type of endoscopy which uses a flexible angioscope to transmit images from the heart and the coronary tree. Angioscopes are valuable tools for use in the investigation and treatment of heart and vascular disease. In various studies, atheromatous plaque rupture and splitting, endothelial exfoliation, and thin mural thrombi that could not be detected by angiography were able to be detected by angioscopy (Ushida, Y. et al. [1989] *Am. Heart Joumal* 117(4):769–776). Unfortunately, angioscopes, which are typically between 1.0 and 1.5 mm in diameter, are not small enough to access the entire coronary tree.

The image guide of existing angioscopes typically has a diameter of about 0.27 mm and is surrounded by fibers arranged circumferentially to provide uniform illumination of the inner lumen. FIG. 1 is a schematic structure of an angiofiberscope image guide. An angioscope image guide is typically a hexagonal array of about 2000 fibers of the step index type. A step index (SI) optical fiber is one in which a fiber is composed of a core surrounded by a cladding where the refractive indices of the core and cladding are $n_1$ and $n_2$ respectively, where $n_1>n_2$. Typically, this SI optical fiber is glass but, as discussed below, SI polymer optical fiber is also known. Light at less than the critical angle, which is transmitted down the core experiences internal reflection with very high efficiency at the core/cladding interface. Although the light reflects efficiently at the boundary, a small fraction of the light temporarily penetrates the cladding in the form of evanescent waves before returning to the core. If the cladding is not thick enough, these evanescent waves can pass through the cladding causing some of this light to leak out, or tunnel, through the cladding into the adjacent fiber. This causes a reduction in resolution and a reduction in contrast sensitivity. If the core diameter is reduced, at fixed cladding thickness, less light is transmitted and the image loses brightness. On the other hand, if the cladding thickness is reduced, for a fixed core diameter, more leakage, or tunneling, occurs. Hence, there is an optimum fiber core diameter and cladding thickness. This optimization process has been studied experimentally (Tsumanuma, T. et al. [1988] *Proc. SPIE* 906:92–96). Tsumanuma et al. determined that a core diameter of 3 $\mu$m and cladding thickness of 1 $\mu$m was optimal.

With a core diameter of 3 $\mu$m and a cladding thickness of 1 $\mu$m, only 36% of the light which hits the end of the step-index glass fiber image guide actually strikes the area defined by the cores of the microfibers. Most of the available light is lost on the cladding area. Since it is only light striking the core area which can contribute to image brightness, only a marginal reduction in microfiber diameter can be made without significant brightness reduction.

The resolution of an image guide is dependent on the number of microfibers per unit cross-sectional area. For example, existing angioscope image guides cannot be increased significantly in diameter to incorporate more microfibers, due to the dimensions of the vascular system, and the diameter of the presently employed microfibers cannot be reduced in size without significant brightness reduction. Therefore, it is difficult to improve the resolution of existing angioscopes.

Another important characteristic of flexible image guides is flexibility as measured by the minimum bend radius of the image guide. The flexibility of existing angioscopes is typically limited by the stiffness of the image guide. For example, the typical minimum bend radius is about 8 mm, which makes procedures difficult in some regions of the coronary tree. This degree of flexibility has been achieved by acid leaching of the image guide to divide it into several separate units, except for its ends where the nicrofiber spatial coherence is mandatory. Further subdivision of the glass image guide would increase flexibility, but at the expense of rapidly increasing the fragility of the microfibers. There is already a fairly rapid deterioration of image quality due to microfiber breakage which shows up as black spots on the image. In addition, coloration of the transmitted image of glass endoscopes has been observed (Tsumanurna et al, *supra*) when the endoscope is subjected to severe bending as occurs in angioscopy. This can cause loss of spectroscopic information in angioscopic clinical diagnosis due to wavelength dependent light leakage from the fiber cores.

Many image guides are made with step index glass optical fiber. Polymer optical fiber fabricated with a step index (SI)

of refraction is also known to those in this art. A cross section of such an SI fiber is shown in FIG. 2. Both polymer and glass SI fibers are constructed with a core and cladding with refractive indices $n_1$ and $n_2$ respectively, where $n_1>n_2$. A second type of fiber is known as gradient-index or graded-index (GRIN) fiber can also be made with polymer or glass. The GRIN structure is also shown in FIG. 4.

In comparing the SI structure with the GRIN structure, it is noted that there are different trajectories of light rays in these two fiber structures. This is shown schematically in FIG. 5. Within SI fiber, the light travels in straight lines. At angles less than the critical angle of internal reflection, the light is reflected at the core cladding interface. At angles greater than the critical angle, the light is refracted into the cladding from which it travels into the adjacent fiber in the SI image guide. This large angle light traverses the various fibers in the image guide until it reaches the side of the image guide and is absorbed. In contrast, within GRIN fiber, the light travels in a curved trajectory, always being refracted back towards the axis of the fiber. At angles less than the critical angle, light never reaches the outer edge of the fiber. At angles greater than the critical angle, the light exits the fiber similar to the case of the SI image guide.

BRIEF SUMMARY OF THE INVENTION

The subject invention pertains to image guides having highly advantageous optical and physical characteristics. The excellent characteristics of the image guides of the subject invention result from the use of gradient-index (GRIN) optical fiber. A further aspect of the subject invention concerns novel manufacturing processes used to produce image guides.

The image guides of the subject invention are highly advantageous because of their small diameter, greater flexibility, and excellent image quality. These image guides are useful in a wide variety of industrial and medical applications. Specifically exemplified herein are endoscopes for use in medical diagnostic procedures such as angioscopy. Also exemplified are borescopes for use in industrial imaging. In general, the image guides of the subject invention can be used in virtually any imaging scope used to examine locations which are inaccessible to the human eye. Such scopes may be used to visualize locations ranging from blood vessels to jet engine blades or high pressure pipes. Such scopes are also used in non-destructive testing procedures.

The image guides of the subject invention achieve substantial improvements in performance compared to existing image guides. Specific advantages that can be achieved utilizing the subject invention include: (1) a brighter image; (2) improved resolution; (3) a smaller diameter so as to be able to pass through narrower openings; (4) greater flexibility; and (5) less expense. By adjusting the dimensions and materials of the image guides of the subject invention, these performance characteristics can be optimized for a particular application. The image guides of the subject invention are particularly advantageous for applications which necessitate the use of a guide having a very small diameter or an image guide which requires a very high resolution for a fixed diameter.

In a specific embodiment, the subject invention pertains to an approximately 0.5 mm diameter angiofiberscope with enhanced flexibility and improved image quality. In the specific application of angioscopy, the subject invention provides access to essentially 100% of the vascular tree with unprecedented image quality.

Scopes of a variety of sizes can be manufactured with this new technology. In one embodiment, these scopes can be plug-in compatible with the already-installed base of electronic cameras, illumination systems, and monitors. In addition to the small diameter endoscope for angioscopy, the subject invention can also be utilized for other applications in medical endoscopy and industrial imaging.

DETAILED DISCLOSURE OF THE INVENTION

Figures 1A, 1B:
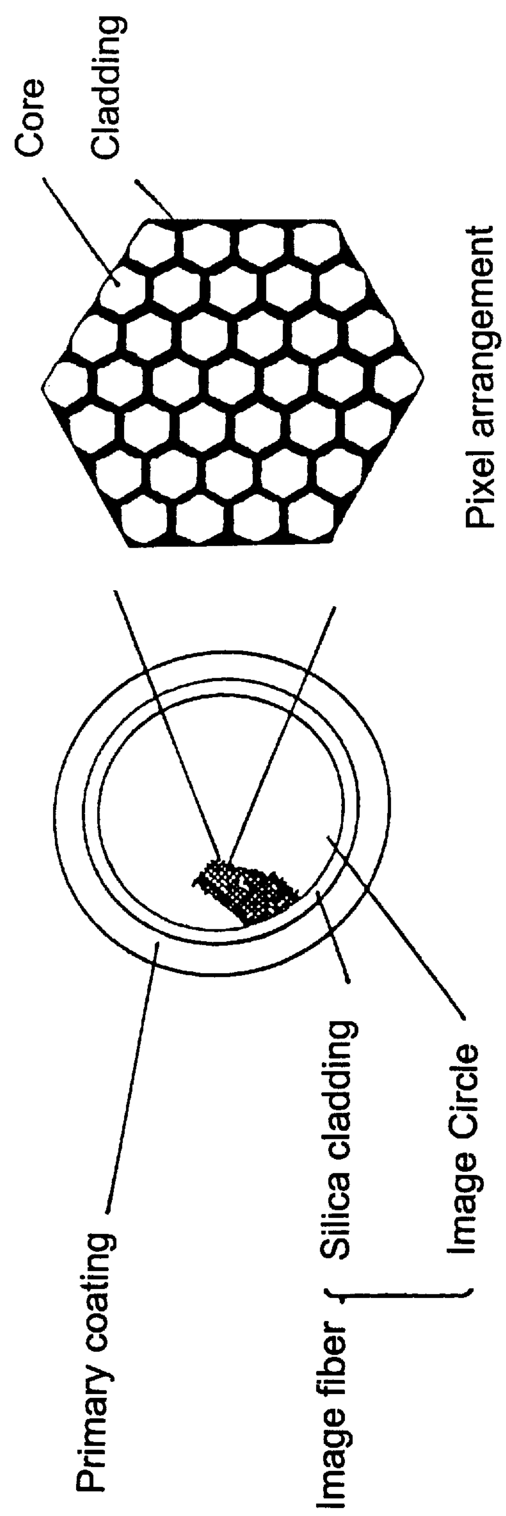
FIG. 1A is a schematic structure of an angiofiberscope image guide.
FIG. 1B is an enlarged view of a cross-section of the image fiber which shows the pixel arrangement of the fibers.
Figure 2:
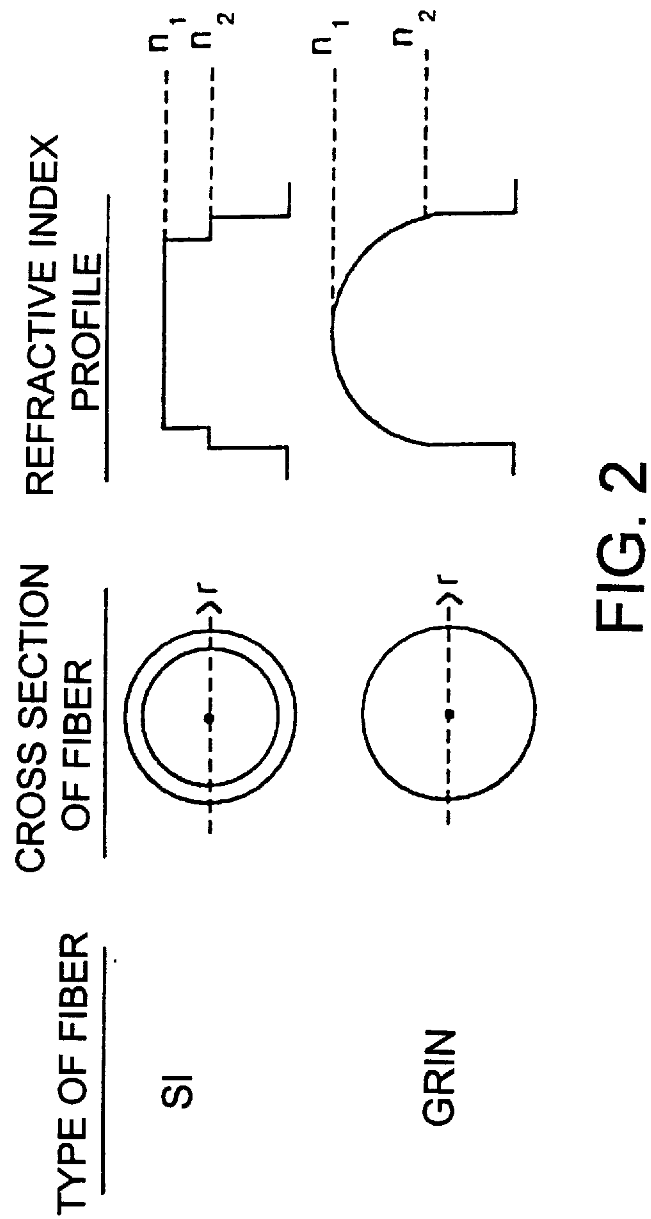
FIG. 2 shows the structures of the two basic types of optical fibers.
Figure 3:
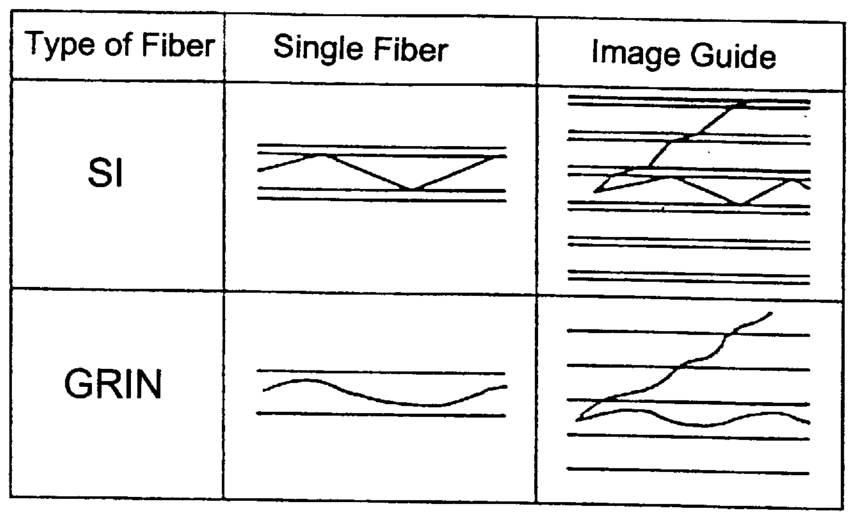
FIG. 3 shows the trajectories of typical light rays in SI and GRIN fibers.

The subject invention utilizes gradient-index (GRIN) optical fiber to produce image guides for use in angioscopes, endoscopes, borescopes, and other imaging scopes. The subject invention achieves substantial improvements in performance compared to existing image guides, including: (1) a brighter image; (2) improved resolution; (3) a smaller diameter to pass through narrower openings; (4) greater flexibility; and (5) less expense. By adjusting the dimensions and materials of the image guides utilizing the teachings of the subject invention, these characteristics can be optimized, to facilitate the use of the image guides for a wide variety of applications. Thus, the image guides of the subject invention can be used in medical endoscopy as well as in industrial imaging. With respect to medical endoscopy, the subject endoscope can be utilized to image internal body structures, for example vessels, internal cavities, and lumens. In a specific embodiment, the subject invention utilizes GRIN plastic optical fiber (POF), to make a major advance in angioscopy. The subject invention further pertains to new manufacturing processes useful in the production of the improved image guides described herein.

The refractive index of a GRIN optical fiber can be generally represented by the axi-symmetric index profile $$n(r)=n_1[1-2\Delta f(r)]^{1/2} \text{ for } r\leq a$$

where f(0)=0, f(a)=1, a is the radius of the core, and $$\Delta = \frac{n_1^2 - n_2^2}{2n_1^2} \simeq \frac{n_1 - n_2}{n_1}$$

In a specific embodiment, $$f(r) = \left(\frac{r}{a}\right)^g$$

where g is the profile parameter which, for g=2, yields a parabolic profile.

There are substantial advantages of the GRIN imaging guide of the subject invention compared to the SI image guide. One of the advantages pertains to the brightness of the images which can be obtained. The brightness, B, of the image transmitted by a guide is defined by the equation:

$$B = S \cdot NA^2 \cdot 10^{-\frac{\alpha L}{10}}$$

where S is the ratio of the total cross-sectional area of the cores of SI fibers (or the total cross-sectional area of GRIN fibers) to the total cross-sectional area of the image guide. NA is the numerical aperture of the fibers, defined $$NA_{SI} = \sqrt{n_1^2 - n_2^2}$$

$$NA_{GRIN} = \frac{1}{\sqrt{2}} \sqrt{n_1^2 - n_2^2}$$

where $NA_{SI}$ and $NA_{GRIN}$ are the numerical apertures for SI and GRIN optical fiber, respectively.

The light attenuation α, is given in units of dB/meter, and L is the length of the image guide in units of meters. The approximate values of these parameters for 5 μm outer diameter fibers are given in Table 1.

TABLE 1

Values of parameters describing optimized SI angioscope image guide, and the GRIN guide

| Image guide | S | NA | α (dB/m) |
|---|---|---|---|
| SI (glass) | 0.36 | 0.43 | 1.0 |
| GRIN (plastic) | 1.0 | 0.46 | 0.2 |

Because the GRIN fiber has no cladding, 100% of the GRIN image guide cross-sectioned surface area is available to transmit light compared to 36% for the optimized SI glass image guide. The numerical aperture of the two types of optical fiber are comparable. In the case of glass (Tsumanuma et a., *supra*), the high value of NA=0.43 is achieved by appropriate ionic doping at the expense of deteriorating the transmission to a value of α=1.0 dB/m. A 5.0 μm diameter GRIN-POF has been measured (Koike, Y. et al. [1993] In *Design Manual and Handbook and Buyers Guide*, Information Gatekeepers, Inc., Boston, p.19) to have an attenuation of 0.2 dB/m. There are at least three ways to produce GRIN-POF, namely, using two or more miscible polymers, using a copolymer with monomer subunits, or by doping a polymer with a low molecular weight additive. For GRIN-POF, a value of NA =0.46 can be achieved with available polymers by making the GRIN-POF by using two or more miscible polymers with different refractive indices. The relative concentrations of the two or more miscible polymers vary radially to produce the required GRIN profile. Alternatively, a copolymer can be used in which the ratio of monomer subunits change as a function of radius in a manner such as to produce the required GRIN profile. Most available GRIN-POF, which is produced by radial dependently doping a given polymer with a low molecular weight additive, has NA in the range 0.1 to 0.22. This NA is adequate for the 100 m lengths used in digital transmission for local area networks. By changing the ratio of the polymer components in the fiber, instead of doping with an additive, the NA can be increased to 0.46 or more.

Figure 4:
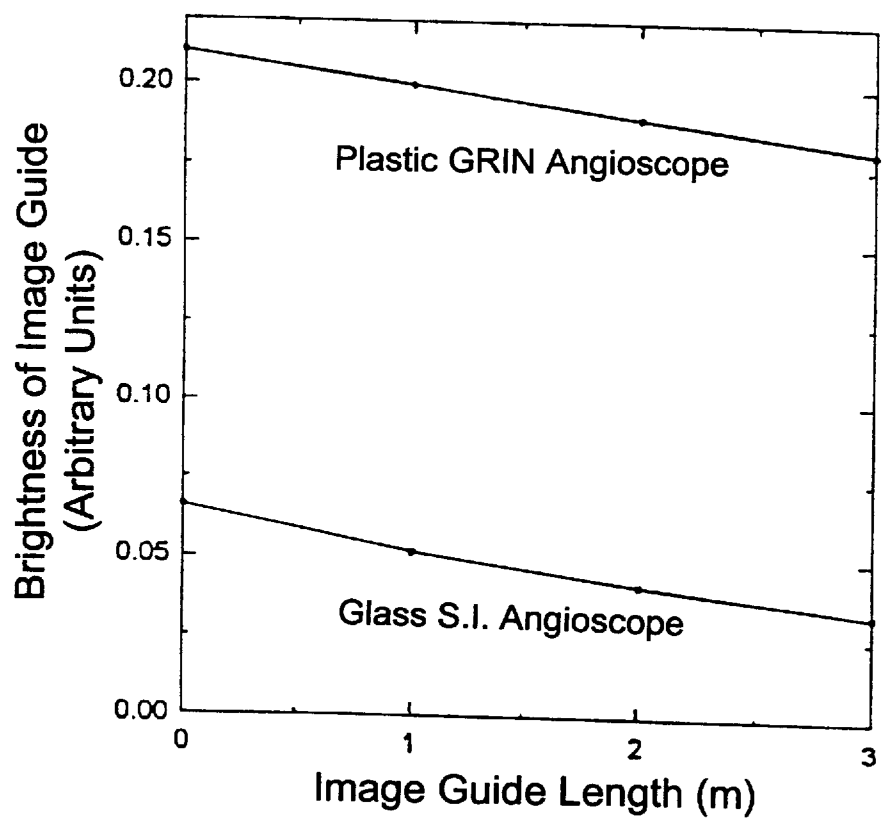
FIG. 4 shows brightness of state of the art glass image guide versus a GRIN guide with the same size microfibers (5.0 μm).

The brightness, B, of the transmitted image has been evaluated using the parameters given in Table 1, and is plotted in FIG. 4. It can be seen that the GRIN-POF image guide is about twice as bright as the existing state of the art SI glass optical fiber (GOF) image guides. We shall assume that the working length of the angioscope is about 1.3 m, and the total length is 3.3 m.

The resolution of an image guide can be improved if a larger number of microfibers is used per unit area. An image guide made of GRIN-POF has 100% of the cross-sectional area of each fiber end available to transmit light. For fundamental physical reasons, the diameter of an optical fiber can only be reduced to about 1.0 μm without losing the ability to transmit light. Therefore, there is much potential improvement in resolution from the existing state of the art of a 5 μm microfiber diameter down to the fundamental limit of 1.0 μm.

Thus, while the brightness of the GRIN-POF guide is about double that of the SI-GOF guide, the improvement in resolution using the GRIN-POF guide is up to a factor of five. These improvements in image quality are substantial and demonstrate the advantages of the GRIN-POF technology of the subject invention.

The flexibility of glass guides is limited to about 8 mm minimum bending radius. This is not adequate for some branches of the coronary tree. In addition, coloration of the transmitted image of glass endoscopes has been observed (Tsumanuma et al., *supra*) when an endoscope is subjected to severe bending as occurs in angioscopy. The endoscopes of the subject invention can have a factor of about five or more greater flexibility, which can provide important advantages particularly in angioscopic applications. If flexibility is not an important criterion in a specific application, then a glass image guide made of GRIN fiber can be used and would offer higher resolution than the existing glass image guides made of SI fibers.

The enhanced flexibility of the subject plastic GRIN fibers is due to the mechanical properties of polymers, which depend upon their processing history. Molecular orientation, such that the polymer chains are aligned along the axial direction of the image guide, produces macroscopic anisotropy. An excellent modern review of this subject is provided by Struik, L.C.E. [1990] *Intemal Stresses, Dimensional Instabilities, and Molecular Orientations in Plastics*, John Wiley & Sons Ltd., Chichester, England. The properties of the chain segments measured in the direction of the polymer chains (and image guide) are determined by strong covalent chemical bonds, whereas weak Van der Waals forces are operating in the transverse direction of the image guide. As a direct result of molecular orientation, there is: (a) increased axial strength of the guide and (b) increased axial strain to break of the guide; and, therefore, enhanced flexibility.

In a preferred method for inducing molecular orientation in a polymeric GRIN image guide, the image guide fiber is stretched, at an appropriate temperature, at low strain rate. This gives the required enhancement in mechanical properties without reduction in optical transmission.

In the subject invention, by using the technique of molecular alignment, a 270 μm diameter polymethylmethacrylate based POF image guide has exhibited unlimited 180° flexing cycles with a bending radius of 1.5 mm. This is to be compared with an 8 mm bending radius limit for the SI glass guide.

The enhanced image quality and flexibility of the angioscopic image guide of the subject invention represents an additional major advance in this type of instrumentation. The subject GRIN-POF image guide is brighter, higher resolution, more flexible, and lower cost than the existing image guides. The GRIN-POF scopes of the subject invention are improved over existing SI-GOF scopes by, for example:

1. For fixed microfiber diameter of about 5 μm and an image guide width of about 270 μm, the GRIN-POF scopes are at least about 50% brighter than SI-GOF scopes.
2. The resolution of the subject GRIN-POF scopes for a fixed guide width of 270 μm are at least 50% higher than SI-GOF scopes.
3. The flexibility of the subject GRIN-POF scopes are at least about three times higher than the existing SI-GOF guide.

In a specific embodiment, the imaging scopes of the subject invention can be inserted into a plastic tube (sheath), which can have a transparent end plate. This combination can then be used for imaging internal body structures. The image viewed through the end plate is unimpaired by the sheath or end plate. The advantage of this sheath is that it is disposable and allows the imaging scopes to be reused with minimal sterilization.

In a preferred embodiment, the sheath can have at least one internal, or external, illuminating optical fiber(s) which transmits light to illuminate the internal body structure to be imaged. Additionally, it is preferred but not essential, that there be no transparent end plate at the distal end of the illuminating optical fiber(s) to avoid the illuminating light reflecting at such a plate and impairing the quality of the image. A longitudinal cross section and a transverse cross section of a sheath comprising an external illumination fiber are shown in FIGS. 8B and 8E, respectively.

When performing, for example, endoscopy or angioscopy, a flexible guiding means, typically made of metal, is often incorporated to facilitate guiding the endoscope or angioscope within the body. A longitudinal cross section and a transverse cross section of a sheath comprising an external illumination fiber, where the sheath is designed to fit over a guiding means incorporated with a plastic optical fiber image guide, are shown in FIGS. 8C and 8E, respectively. In this case, the sheath and illuminating fiber could be regarded as disposable after a single use.

Accordingly, the intubation scope and/or sheath of the subject invention can comprise such a flexible guiding means, such that many combinations of imaging scope, guiding means, illuminating fiber(s), and sheath are possible.

Following are examples which illustrate procedures for practicing the invention. These examples should not be construed as limiting.

EXAMPLE 1

Production of GRIN Fiber

General processes for fabricating a plastic GRIN optical fiber are known to those skilled in this art. These processes can produce plastic GRIN fiber wherein the refractive index varies in a controlled way as a function of radius. Typically, the refractive index varies parabolically as a function of the radius. The varying refractive index can be achieved by, for example, radial dependently doping a given polymer with a low molecular weight additive. Alternatively, in a preferred embodiment of the present invention, plastic GRIN fiber is made by using two miscible polymers with different refractive indices whose relative concentrations vary radially to produce the required refractive index profile.

Figure 5:
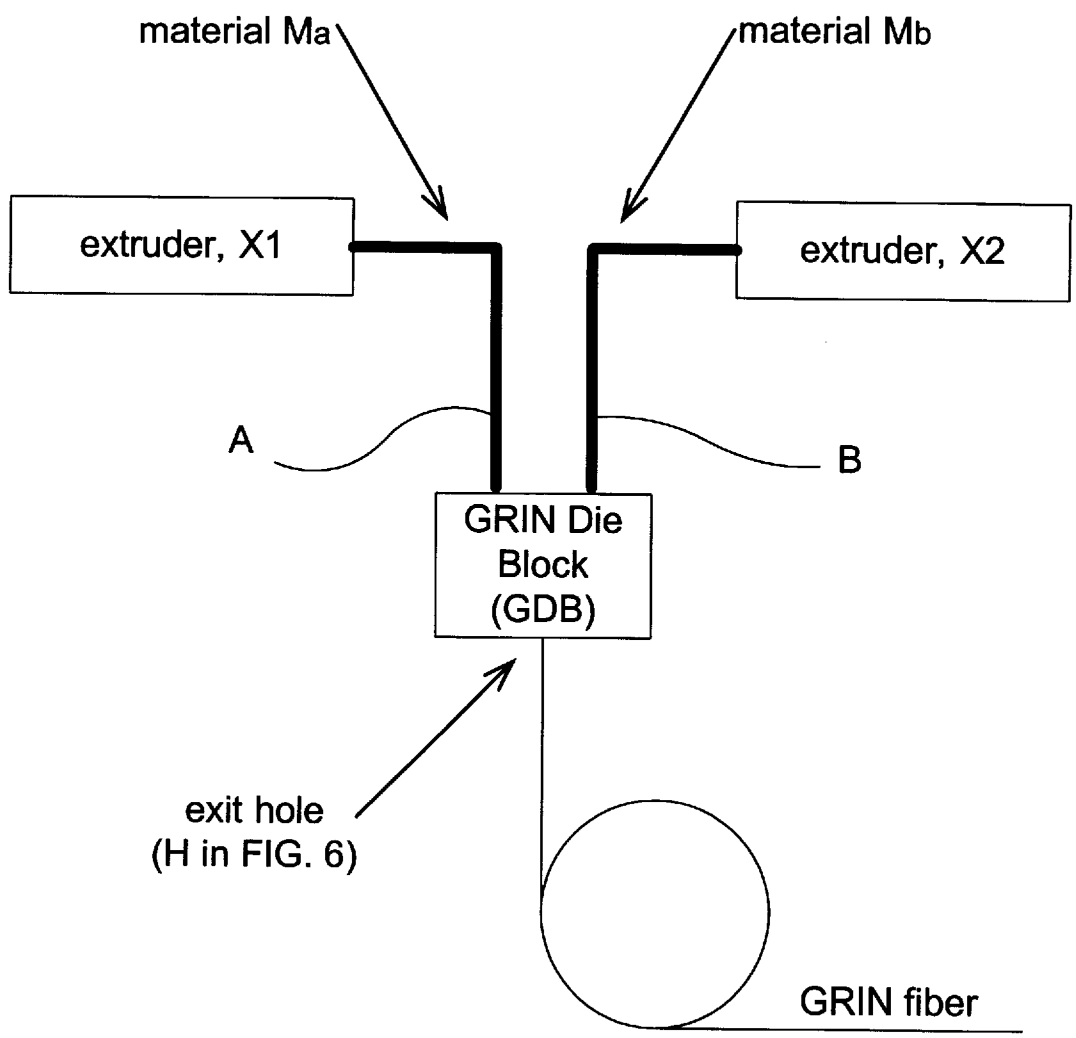
FIG. 5 illustrates, schematically, a specific embodiment of the subject method for continuous production of GRIN fibers made by using two miscible optical polymers with different refractive indices whose relative concentrations vary radially to produce the required refractive index profile.
Figure 6A:
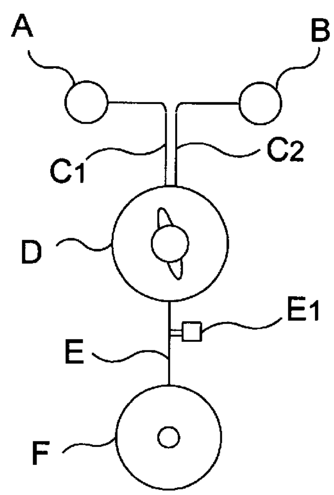
FIG. 6A and 6B are is a schematic of the GRIN die block (GDB).
Figure 6B:
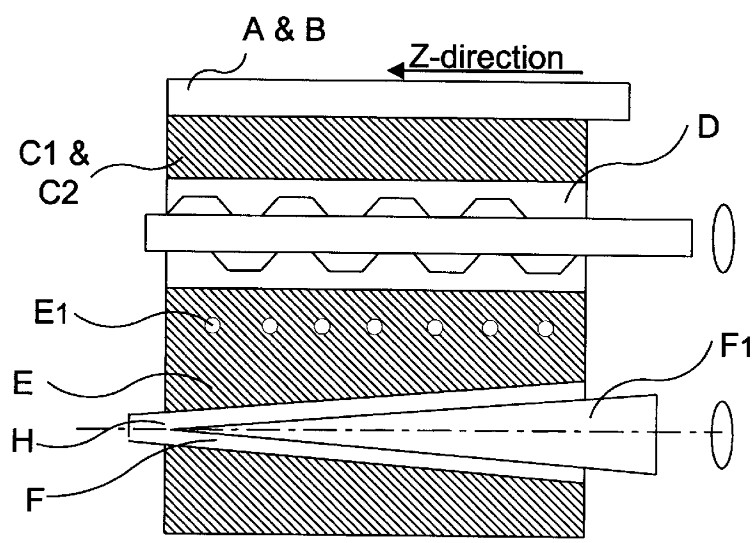

FIG. 5 illustrates, schematically, a specific embodiment of the subject method for continuous production of GRIN fibers made by using two miscible optical polymers with different refractive indices whose relative concentrations vary radially to produce the required refractive index profile. Two optical polymers (materials $M_a$ and $M_b$) with different refractive indices are introduced to the GRIN die block (GDB) through separate feed channels, A and B, by two extruders, X1 and X2. The GDB is shown, schematically, in more detail in FIG. 6. Material $M_a$, which is fed to the channel A, flows into the mixing chamber D through the channel C1, whereas the material $M_b$ flows from channel B to a mixing chamber D through the channel C2. By varying the gap, G, or length, L, of the channels C1 and C2, the flow rate of each material can be varied in the axial, or z-direction (see FIG. 7). Consequently, a blend with a gradually varying composition in the z-direction can be prepared in the mixing chamber D.

Since the refractive index of the polymer blend depends on the ratio of component polymers in the blend composition, the blended material in the mixing chamber D can have a gradually varying refractive index along the z-direction. While the rotating mixer blade D located in the middle of the mixing chamber D provides uniform mixing of the two materials $M_a$ and $M_b$ at each location of z, axial mixing in the z-direction does not occur since there is essentially no pressure gradient in the z-direction.

The axially varying blend prepared in the mixing chamber D is then fed through the channel E to the feed chamber F which houses a rotating cone F1. As used herein, reference to a cone refers to any tapering cylindrical form. The taper can be, but does not have to be, at a constant angle. While the material is flowing from D toward the die exit H through E and F, the axial variation of the blend composition in the mixing chamber D is converted to a radial variation, thus creating the gradient-index fiber.

Figure 7:
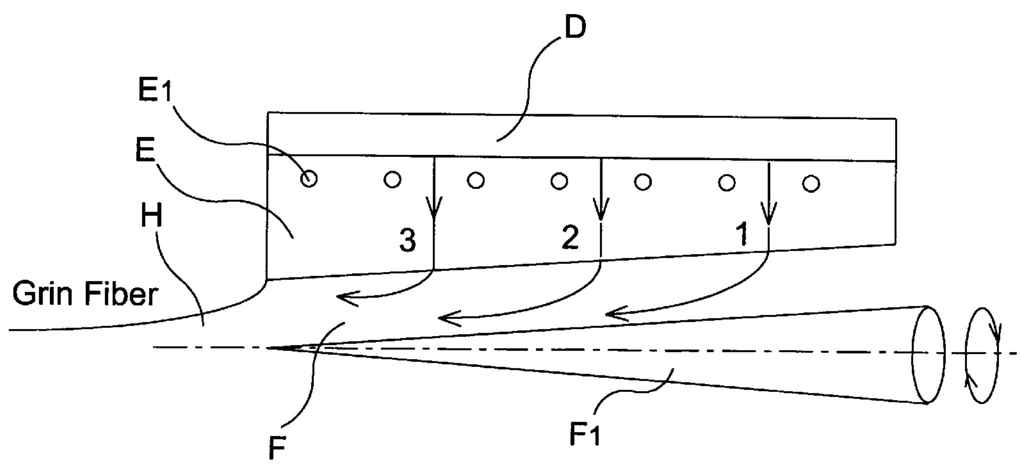
FIG. 7 is a schematic of the flow pattern in the feed chamber.

In FIG. 7, the flow pattern of the polymer blend is shown schematically. Since the material fed to the feed chamber F at a downstream location near the die exit H is swept by the upstream material, it is positioned away from the rotating cone F1. The flow patterns 1, 2, and 3 of FIG. 7 show such positioning of materials schematically. Due to the rotating cone F1, the materials in the feed chamber F follow a helical stream line pattern. For simplicity, however, only the axial and radial components of the flow pattern are depicted in FIG. 7. The rotating cone is for the uniform positioning of the material in the circumferential direction so that the axisymmetry of refractive index can be ensured while creating radially varying refractive index. The rotation speed of F1 should be sufficiently high to ensure the axisymmetry of refractive index, preferably taking into account the residence time of the material in the feed chamber F.

When the material leaves the die exit H, the circular strand has a refractive index decreasing with the radial position and a gradient-index optical fiber is formed when the strand is pulled off.

EXAMPLE 2

Production of Small Diameter GRIN Fiber Image Guide

The subject plastic GRIN image guide can be produced by thermal processing of the original GRIN fiber. Examples of thermal processing include fusing, drawing, and stretching. Many original GRIN fiber sections can be fused together to produce a multifiber image guide. This multifiber image guide can be drawn to reduce the diameter of the image guide and each individual fiber contained therein. Finally, the image guide can be stretched to increase the flexibility.

At elevated temperature, low molecular weight additives have enhanced diffusivity. As a result, plastic GRIN fiber made with additives may end up with a degraded refractive index profile. Therefore, in a preferred embodiment, the plastic GRIN image guide should be made with fiber composed entirely of at least two miscible polymers where there will be no degradation of the profile.

In one embodiment, approximately 0.5 mm diameter GRIN fiber is cut into 1.0 m length sections, and approximately 10,000 fiber sections are bundled together in a 100×100 square. This bundle is set within a 50 mm×50 mm cross-section stainless steel square tube. The tube is placed in a heated oven and the fibers are subjected to pressure at an appropriate temperature to make a fused boule of solid polymeric fibers. A square tube is preferred because it is easier to apply pressure to the bundle of fibers, although a round tube can also be used. The solid square boule may be machined into a round boule if a round image guide, rather than a square image guide, is desired. The solid boule is then placed in the heating chamber of a drawing tower, in which the lower part of the boule is continuously heated and drawn down to a uniform diameter multi-microfiber image guide. As those skilled in the art would readily appreciate, it is important when manufacturing image guides that the ends of the image guide be coherently related to each other.

Image guides can be produced with outer diameters as small as approximately 0.5 mm down to approximately 0.1 mm containing microfibers of approximately 5 μm down to approximately 1 μm, respectively. This range of microfiber diameters extends from the existing glass microfiber diameter (5 μm) of small diameter fiberscopes down to the fundamental limit (approx. 1.0 μm).

The image guide may have an outer protective cladding of polymer extruded upon it in the conventional cross-head die method, or by solution cladding if desired. The image guide is cut to length, the ends are polished and a gradient-index rod lens is attached, preferably glued, onto one end. The resulting fiberscope can be sterilized with solution, or ETO prior to use and thereafter, to facilitate reuse, if desired.

EXAMPLE 3

Production of Large Diameter GRIN Fiber Image Guide

A GRIN fiber image guide can be made with either GRIN-GOF or GRIN-POF. If made with glass, the image guide will be more rigid and can have application where a more rigid image guide is preferred. If made with polymer, the image guide will be flexible and can be used in applications where flexibility is desired. A 3 mm diameter GRIN POF image guide can be made with the high resolution of 1000×1000 corresponding to the high definition television (HDTV) standard. Image guide with a 100×100 array of 3 μm diameter microfibers is produced as described in Example 2. This square image guide, 0.3 mm diameter, fiber bundles are arranged in a 10×10 array with dimensions of 3 mm×3 mm of the desired length of say 1 m. Low viscosity epoxy is used at each end (within 1 cm of the end) of the array to secure the positions of the fibers. When the epoxy is cured the ends are cut and polished. The guide is given a GRIN lens at one end, and protective cladding as described in Example 2. The resulting image guide has a higher resolution than heretofore achieved.

EXAMPLE 4

Production of a 3 mm Diameter Fiber Optic Taper

When an image is presented at one end of existing fiber optic tapers, the output face of the taper displays an image which is larger or smaller than the input image. The ratio of image sizes is equal to the ratio of the dimensions of the input and output faces of the taper (called the taper ratio). Existing tapers are based on glass SI fiber and have typical taper ratios of 2:1 or 3:1. At the small end of the taper, the microfiber is usually no less than 5 μm, for the important reasons discussed earlier. Therefore, the microfiber dimension at the large end of the taper will be 15 μm, for a taper ratio of 3:1. The spatial resolution of existing taper is, thus, severely limited.

This example describes a fiber optic taper which has about twice the resolution of the existing tapers. An image guide is made in the manner described in Example 2 with dimensions 0.75 mm×0.75 mm, and containing 7.5 μm microfiber. A 20×20 array of sections of this image guide, 20 cm long, is packed into a square cross section stainless steel tube. The assembly is placed into a vacuum oven. After a vacuum is established, the temperature is increased. At a temperature, about 20°–60° C. above the polymer glass transition temperature, the fibers fuse into a solid mass. The oven is allowed to cool to room temperature, and the fused boule is removed from the fixture. The boule is placed in a stretching machine, whose design is identical to the machines used for producing glass fiber optic tapers. Each end of the boule is held by a rotating chuck. The center of the boule is heated by a cylindrical heater. When the boule has reached the appropriate temperature, the chucks are both retracted in unison. The boule is stretched and forms an hour glass shape. Heat is turned off and the boule is permitted to cool while still rotating. The boule is removed from the fixture, and cut at the locations required for the desired taper ratio of 3:1. Two symmetric tapers are produced from each stretched boule. The microfiber dimensions at the large and small ends are 7.5 μm and 2.5 μm respectively. This GRIN based fiber optic taper has twice the resolution of existing glass tapers.

EXAMPLE 5

Production of a Fiber Optic Plate

Fiber optic plates are frequently used to attach to the surface of an opto-electronic device such as a charge coupled device (CCD). As dimensions of the structures of these semiconducting devices continue to decrease, it is increasingly important to use a fiber optic plate with microfibers less than 5 μm in size. In this way, the resolution of the system will be improved.

This example concerns the production of a fiber optic plate containing 2.5 μm microfibers. Image guide fiber was produced, as in Example 2, with dimensions 250 μm×250 μm. One meter lengths of this fiber are packed into a 25 mm×25 mm fixture to form an array of 1000×1000 fibers. The fibers are fused as before to form a solid boule.

Next, this solid boule is cut into sections and a 25 by 25 bundle of these solid boule sections is placed within a 1 inch×1 inch stainless steel square tube. The tube is placed in a heated oven and the solid boule sections are subjected to pressure at an appropriate temperature to make a second fused boule of solid polymeric fibers, said second boule being approximately 1 inch by 1 inch. Finally, a section is cut off the end of the boule and the ends of the boule section are polished to make a fiber optic plate.

EXAMPLE 6

Figure 8D:
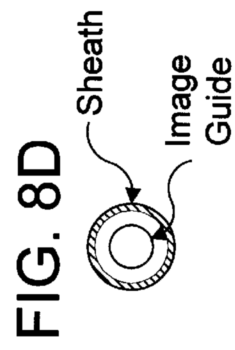
FIGS. 8A and 8D illustrate a longitudinal cross section and a transverse cross section, respectively, of the distal end of a sheath designed to fit over a plastic optical fiber image guide.
Figure 8E:
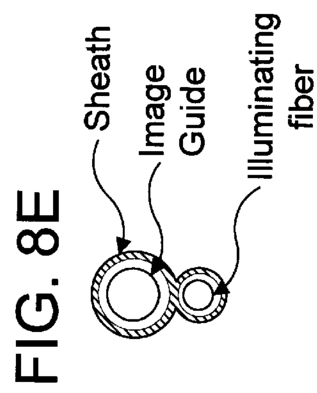
FIGS. 8B and 8E illustrate a longitudinal cross section and a transverse cross section, respectively, of the distal end of a sheath designed to fit over a plastic optical fiber image guide, wherein the sheath comprises an illumination fiber.
Figure 8F:
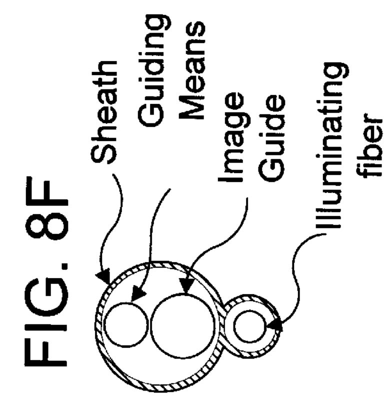
FIGS. 8C and 8F illustrate a longitudinal cross section and a transverse cross section, respectively, of the distal end of a sheath designed to fit over a guiding means incorporated with a plastic optical fiber image guide, wherein the sheath comprises an illumination fiber.
Figure 8A:
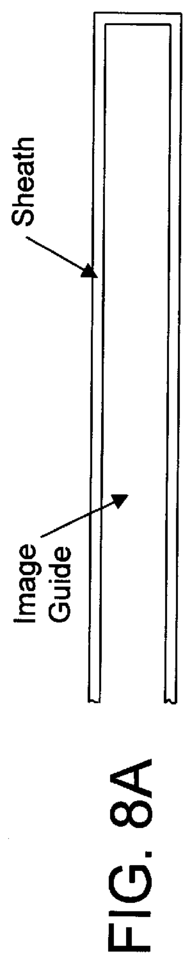
Figure 8B:
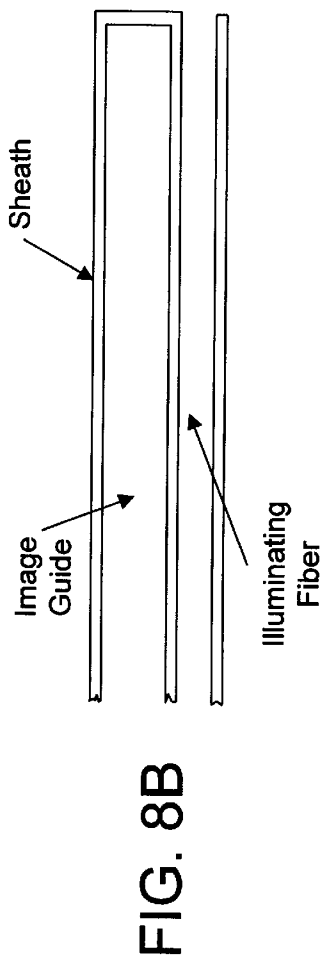
Figure 8C:
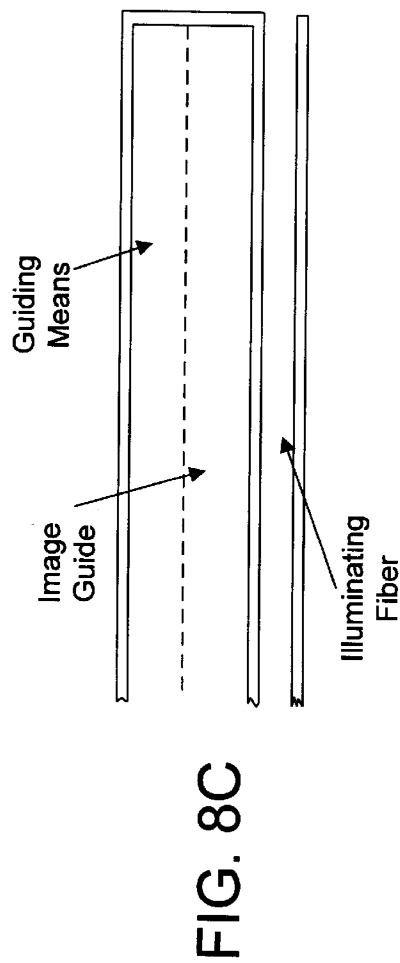

Referring to FIGS. 8A–8F, this example provides three illustrative combinations of image guide, illuminating fiber, guiding means, and/or sheath. FIGS. 8A and 8D illustrate a longitudinal cross section and a transverse cross section, respectively, of the distal end of a sheath designed to fit over a plastic optical fiber image guide. The sheath covers the distal tip of the image guide with a transparent end plate. In this case, any illuminating fibers and/or guiding means would not be enclosed within this sheath, although they could have their own sheaths.

FIGS. 8B and 8E illustrate a longitudinal cross section and a transverse cross section, respectively, of the distal end of a sheath designed to fit over a plastic optical fiber image guide, wherein the sheath comprises an illumination fiber. The distal end of the illumination fiber is not covered by the sheath, in this example, so as to not impair the image. Accordingly, the illuminating fiber can be disposed of with the sheath. In this embodiment, the sheath acts to attach and position the illumination fiber with respect to the image guide.

FIGS. 8C and 8F illustrate a longitudinal cross section and a transverse cross section, respectively, of the distal end of a sheath designed to fit over a guiding means incorporated with a plastic optical fiber image guide, wherein the sheath comprises an illumination fiber. The distal end of the illumination fiber is not covered by the sheath, but the distal end of the image guide plus guiding means is covered. In this embodiment, the guiding means can be reused along with the image guide. Other geometrical arrangements of the guiding means, image guide, and illumination fiber are obviously possible.

It should be understood that the examples and embodiments described herein are for illustrative purposes only and that various modifications or changes in light thereof will be suggested to persons skilled in the art and are to be included within the spirit and purview of this application and the scope of the appended claims.

I claim:

1. An image guide, comprising a plurality of gradient-index optical fibers, wherein when an input image is incident on a first end of said image guide, each of said plurality of gradient-index optical fibers transmits an amount of light from the first end of said each fiber to a second end of said each fiber, such that a plurality of amounts of light are transmitted from the first end of the image guide to the second end of the image guide, and wherein an output image is formed at the second end of the image guide by the plurality of amounts of light output at the second ends of the plurality of gradient-index optical fibers, such that each output amount of light is one pixel of the output image.

2. The image guide, according to claim 1, comprising glass optical fibers.

3. The image guide, according to claim 1, comprising plastic optical fibers.

4. The image guide, according to claim 3, wherein said gradient-index plastic optical fibers comprise at least two miscible polymers with different indices of refraction.

5. The image guide, according to claim 4, wherein said miscible polymers are selected from the following group: methacrylate family and acrylate family.

6. The image guide, according to claim 3, wherein said gradient-index plastic optical fibers comprise a copolymer wherein the ratio of monomer subunits varies as a function of radius.

7. The image guide, according to claim 3, wherein said gradient-index plastic optical fibers comprise a polymer with low molecular weight additives, wherein the concentration of the low molecular weight additives varies in the radial direction.

8. The image guide, according to claim 1, wherein said image guide is a fiber optic taper.

9. The image guide, according to claim 1, wherein said image guide is a fiber optic plate.

10. An imaging scope comprising an image guide, wherein said image guide comprises a plurality of gradient-index optical fibers, wherein when an input image is incident on a first end of said image guide, each of said plurality of gradient-index optical fibers transmits an amount of light from the first end of said each fiber to a second end of said each fiber, such that a plurality of amounts of light are transmitted from the first end of the image guide to the second end of the image guide, and wherein an output image is formed at the second end of the image guide by the plurality of amounts of light output at the second ends of the plurality of gradient-index optical fibers, such that each output amount of light is one pixel of the output image.

11. The imaging scope, according to claim 10, wherein said imaging scope is an endoscope.

12. The imaging scope, according to claim 10, further comprising a sheath within which said imaging scope is inserted during use.

13. The endoscope, according to claim 11, said endoscope comprising:

(a) a means for mechanically guiding said endoscope into and within a body;

(b) a means for angulating the distal tip; and (c) a means for illuminating an obect to be imaged within the body, wherein said apparatus has a minimum radius of curvature less than about 8.0 mm.

14. The imaging scope, according to claim 10, wherein said imaging scope is an angioscope.

15. The imaging scope, according to claim 10, wherein said imaging scope is a borescope.

16. The imaging scope, according to claim 10, wherein said imaging scope is an industrial imaging scope.

17. The image guide, according to claim 1, wherein the spatial relationship of the fibers comprising the first and second ends of the image guide are coherently related to each other.

18. The image guide, according to claim 1, wherein each of said plurality of gradient-index optical fibers have a diameter between about 1 μm and about 30 m.

19. The image guide, according to claim 1, wherein essentially all of said plurality of gradient-index optical fibers have approximately the same length.

20. The image guide, according to claim 1, wherein essentially the entire cross-sectional area of each of said plurality of gradient-index optical fibers is available to transmit light.

21. The image guide, according to claim 5, wherein at least one miscible polymer is fluorinateed.

22. The image guide, according to claim 5, wherein at least one miscible polymer is chlorinated.

23. The image guide, according to claim 1, wherein said plurality of gradient-index optical fibers have an index profile which can be represented as $n(r)=n_1[1-2\Delta f(r)]^{1/2}$ for $r \leqq a$ where $f(0)=0$, $f(a)=1$, a is the radius of the core and $$\Delta = \frac{n_1^2 - n_2^2}{2n_1^2} \simeq \frac{n_1 - n_2}{n_1}.$$

24. The image guide, according to claim 23, wherein $$f(r) = \left(\frac{r}{a}\right)^g$$

where g is a profile parameter.

25. The image guide, according to claim 24, wherein g=2 such that the index of refraction profile is parabolic.

* * * * *

UNITED STATES PATENT AND TRADEMARK OFFICE

CERTIFICATE OF CORRECTION

PATENT NO. : 5,881,195

DATED : March 9, 1999

INVENTOR(S) : James K. Walker

It is certified that error appears in the above-identified patent and that said Letters Patent is hereby corrected as shown below:

Column 2, line 61: "Tsumarurna" should read --Tsumanuma--.

Column 5, line 60: "Tsumanuma et a.," should read --Tsumanuma *et al.*,--.

Column 6, line 58: "Intemal" should read --Internal--.

Column 8, line 33: "D" should read --D1--.

Column 12, line 60: "30 m." should read --30 μm.--.

Column 13, line 2: "fluorinateed" should read --fluorinated--.

Signed and Sealed this

Thirteenth Day of July, 1999

Attest:

Q. TODD DICKINSON

*Attesting Officer*

*Acting Commissioner of Patents and Trademarks*